Nov. 2, 1965    H. S. TOLAN, JR    3,214,994
STEERING COLUMN NOISE BARRIER
Filed Dec. 18, 1962

INVENTOR.
HOMER S. TOLAN, JR.
BY J. R. Faulkner
Stuart Lubitz
ATTORNEYS

United States Patent Office 3,214,994
Patented Nov. 2, 1965

3,214,994
STEERING COLUMN NOISE BARRIER
Homer S. Tolan, Jr., Dearborn, Mich., assignor to Ford Motor Company, Dearborn, Mich., a corporation of Delaware
Filed Dec. 18, 1962, Ser. No. 245,618
5 Claims. (Cl. 74—490)

This invention relates to a noise barrier. More particularly the invention relates to a means for improving the sound proofing between the engine compartment and the passenger compartment.

It is a well-known acoustical principle that the best suppressor of noise between two air spaces which are compartmented consists of a high mass barrier which has a minimum of openings that may form passageways between the compartments. In present steering columns a light wool fiberglass or felt filter is positioned between the steering shaft and the steering column tube as a noise barrier. This barrier is ineffective because the density of either the fiberglass or felt is too low to serve as an effective noise barrier. In addition, these materials tend to pack when deflected by the relative movements between the steering shaft and steering column tube and therefore do not hug the diameters of these components sufficiently to prevent a passageway from the engine compartment to the passenger compartment. As a result of these deficiencies, the steering column acts as a direct pipeline for transmitting noises from the engine compartment to the passenger compartment.

The present invention remedies the above-mentioned deficiencies by providing a heavier barrier to noise without interfering with the relative motion, both rotary and transverse, between the steering shaft and the steering column tube. Generally the invention involves the attaching of a high mass or density barrier to the steering shaft or to the steering column tube which does not interfere with the movement of the steering shaft.

The general object of this invention is to provide an improved noise barrier.

Another object of this invention is to provide an improved noise barrier for the steering column of an automotive vehicle.

Other objects and advantages of this invention will be understood when the written description is read in conjunction with the drawings wherein.

Figure 1:
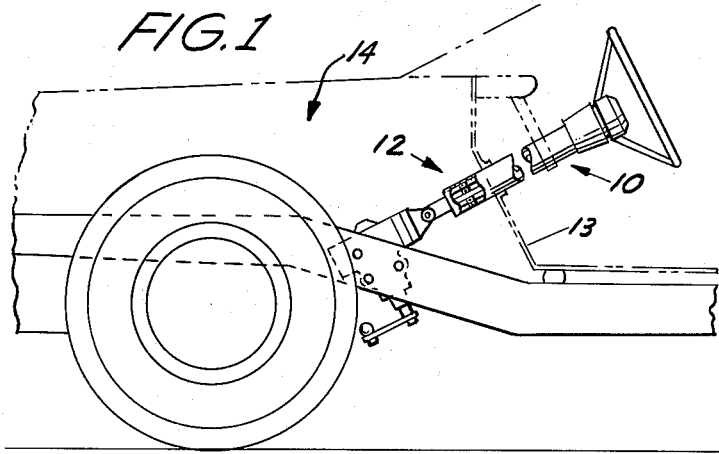
FIGURE 1 is a schematic diagram of a steering column embodying the instant invention.

Referring to FIGURE 1 the steering column 10, which communicates with the passenger compartment and the engine compartment, is shown employing the improved noise barrier indicated generally at 12. The particular steering column arrangement utilized in this embodiment of the invention is commonly known as a concentric steering column. Such a steering column is described in detail in U.S. Patent 2,959,067 issued to G. H. Primeau on November 8, 1960. It should be understood that the invention is applicable to any type of steering column such as the eccentric type of steering column.

Figure 2:
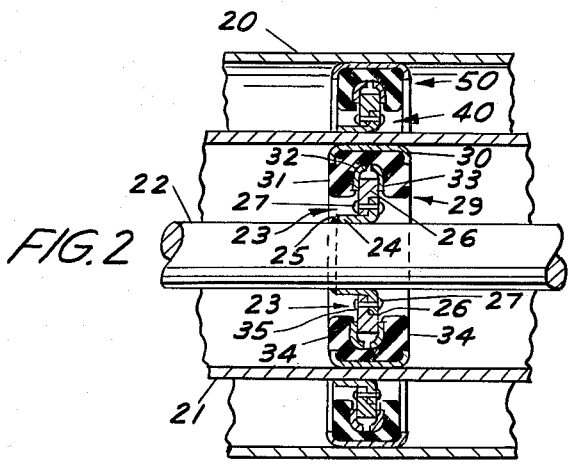
FIGURE 2 is a fragmentary sectional view of the improved noise barrier.

In the embodiment of the invention shown in FIGURES 1 and 2, the noise barrier 12 is mounted on the steering column 10 and is located below the floor board 13 and adjacent to the engine compartment 14. The steering column 10 comprises a first steering column tube 20 which is maintained in a fixed position, a second steering column tube 21 which is attached to the shift linkage (not shown) and moves relative to the first steering column tube 20 and a steering shaft 22 which is attached to the steering wheel and moves relative to both the first steering column tube 20 and the second steering column tube 21. Attached to the steering shaft 22 is a first noise barrier means 23 which comprises a hub 24 rigidly attached to the steering shaft by suitable fastening means such as weld 25 and a ring-like member 26 fastened to the hub 24 by the fastening means 27. The ring 26 is preferably made of a low friction material such as nylon or a suitable metal. A second noise barrier 29 is fastened to the second steering column tube 21 and is adapted to permit a minimum of clearance between it and the first noise barrier and to permit relative movement between it and the first noise barrier 23. The second noise barrier comprises an annular member 30 which is fixed to the second steering column tube 21 by suitable fastening means, a flexible circular channel member or rubber ring 31 that is rigidly attached or bonded to the annular member 30 and a pair of inserts 32 and 33 made from a low friction material such as nylon or a suitable metal. The rubber ring 31 has a plurality of legs 34 that are adjacent to the surfaces 35 and 36 of the ring-like member 26. The inserts 32 and 33 are fastened to the rubber ring 31 and held snugly against the metal or nylon ring 26 by legs 34 of the rubber ring 31. This construction permits a relatively tight fit between the first and second noise barriers 23 and 29 but allows relative movement between the steering shaft 22 and the second steering column tube 21.

A third noise barrier 40, identical in construction with the first noise barrier 23, is rigidly attached to the second steering column tube 21 and a fourth noise barrier 50, identical in construction with the second noise barrier, is attached to the first steering column tube 20.

In operation the steering shaft may move the first noise barrier 23 relative to the second noise barrier 29 and the second steering column tube 21. The second steering column tube 21 moved by shift linkage (not shown) may rotate the second noise barrier 29 and the third noise barrier 40 relative to the first noise barrier 23 and the fourth noise barrier 50. In addition to allowing the above relative movements between the steering column tubes and the steering shaft, the rubber and nylon construction of the barriers presents a high mass barrier to any noise transmitted from the engine compartment. It should be noted that the friction created by the sliding engagement of the first noise barrier 23 and the second noise barrier 29 may be utilized advantageously to apply a relatively constant friction load to the steering wheel. Such a constant load maintains the steering wheel "feel." To this end the resilient or flexible channel member 31 may be designed to apply a selected pressure to the inserts 32 and 33.

Figures 3, 4:
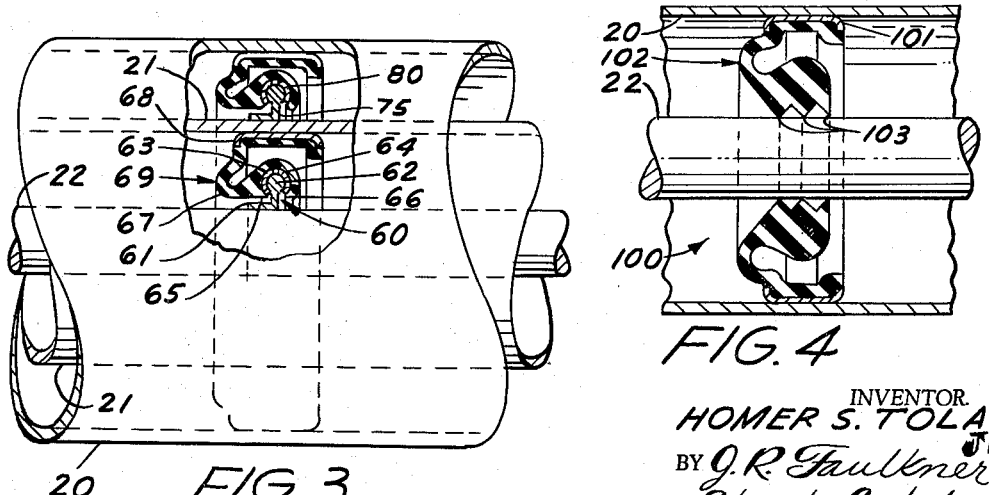
FIGURE 3 is a fragmentary sectional view of an alternate embodiment of the improved noise barrier.
FIGURE 4 is a fragmentary sectional view of another alternate embodiment of the improved noise barrier.

An alternate embodiment of the invention is shown in FIGURE 3. This embodiment of the invention utilizes a first noise barrier 60 comprising a metal ring 61 with a beaded or rail portion 62. The beaded portion 62 cooperates with two nylon inserts 63 and 64 that are urged into contact with the beaded portion 62 by the lips 65 and 66 of the rubber member 67. The rubber member 67 is rigidly attached or bonded to the ring 68 which is in turn fastened by suitable fastening means to the second steering column tube 21. The rubber member 67 has a convolute shape which accommodates any transverse relative movement. The nylon inserts 63 and 64, the rubber member 67 and the ring 68 form a second noise barrier 69.

A third noise barrier 75, identical in construction with the first noise barrier 60, is rigidly attached to the second steering column tube and a fourth noise barrier 80, identical in construction with the second noise barrier 69, is rigidly attached to the first steering column tube. In its operation, this embodiment of the invention is similar to the embodiment of the invention shown in FIGURE 2 with the exception that the second and fourth noise barriers have the added advantage of readily accommodating any transverse relative movement.

The above embodiments of the invention have been described in the environment of a concentric steering column assembly. It should be understood that the described construction could be readily adapted to an eccentric steering column assembly by simply removing the third and fourth noise barriers.

Another embodiment of the invention is shown in FIGURE 4 in the environment of an eccentric steering column. This embodiment has a single convoluted noise barrier 102 attached to the steering column tube 20 by the hub member 101 which is fastened to the steering column tube 20. There are a plurality of surfaces 103 on the noise barrier 102 which abut the steering shaft 22. The noise barrier 102 may be made from a low friction material such as nylon or a lubricated elastomer. It should be understood that the noise barrier 102 may be attached to steering shaft 22 of the steering column 20. This embodiment of the invention operates in a manner similar to the previously described embodiments and has the same advantages as these embodiments.

It will be understood that the invention is not to be limited to the exact construction shown and described, but that various changes and modifications may be made without departing from the spirit and scope of the invention, as defined in the appended claims.

I claim:

1. In an automobile having an engine compartment and a passenger compartment, the combination comprising a steering column which communicates with the engine compartment and the passenger compartment, said steering column having a steering column tube, and a steering shaft movable within said steering column tube, a first noise barrier means for preventing the transmission of noise from the engine compartment to the passenger compartment, said first noise barrier means comprising a ring-like member attached to the steering shaft, a second noise barrier means for preventing the transmission of noise from the engine compartment to the passenger compartment, said second noise barrier means comprising a flexible circular channel member positioned adjacent said ring-like member and attached to said steering column tube and an insert attached to the interior of said flexible channel member, said ring member extending into the interior of said flexible channel and into engagement with said insert.

2. In an automobile having an engine compartment and a passenger compartment, the combination comprising a steering column which communicates with the engine compartment and the passenger compartment, said steering column having a steering column tube and a steering shaft movable within said steering column, a first noise barrier means for preventing the transmission of noise from the engine compartment to the passenger compartment, said first noise barrier means comprising a ring-like member attached to the steering shaft and made of a relatively low friction material, said ring member having a first and second surface, a second noise barrier means for preventing the transmission of noise from the engine compartment to the passenger compartment, said second noise barrier means comprising a flexible circular channel having a plurality of legs, said flexible circular channel fixed to said steering column tube and positioned to have one of said legs adjacent each of the surfaces of said ring member, and an insert made of a low friction material attached to said legs of said channel and in sliding engagement with said surfaces of said ring member.

3. In an automobile having an engine compartment and a passenger compartment, the combination comprising a steering column having a steering column tube which remains in a fixed position and a movable steering shaft, a first noise barrier means for preventing the transmission of noise from the engine compartment to the passenger compartment, said first noise barrier means comprising a ring member with a rail-like cross section attached to said steering shaft, and a second noise barrier means for preventing the transmission of noise from the engine compartment to the passenger compartment, said second noise barrier means comprising a convoluted flexible member attached to said steering column tube, said convoluted flexible member having a lip portion which slidably engages said rail-like portion of said ring member.

4. In an automobile having an engine compartment and a passenger compartment, the combination comprising a steering column having a steering column tube and a steering shaft movable within said steering column tube, a first noise barrier means for preventing the transmission of noise from the engine compartment to the passenger compartment, said first noise barrier means comprising a ring member with a rail-like cross section attached to said steering shaft and a second noise barrier means for preventing the transmission of noise from the engine compartment to the passenger compartment, said second noise barrier means comprising a convoluted flexible member attached to said steering column tube, said convoluted flexible member having a lip portion, an insert of low friction material attached to said lip portion and urged into slidable engagement with said rail-like portion by said lip portion.

5. In an automobile having an engine compartment and a passenger compartment, the combination comprising a steering column having a steering column tube and a steering shaft movable within said steering column tube, a first noise barrier means for preventing the transmission of noise from the engine compartment to the passenger compartment, said first noise barrier means comprising a ring member with a rail-like cross section attached to said steering shaft and a second noise barrier means for preventing the transmission of noise from the engine compartment to the passenger compartment, said second noise barrier means comprising a convoluted flexible member attached to said steering column tube, said convoluted flexible member having a lip portion substantially surrounding the rail-like portion of said ring member, an insert of low friction material having a shape complementary to and substantially surrounding said rail-like portion of said ring member attached to said lip portion of said convoluted flexible member and urged into engagement with said rail-like portion of said ring member by said lip portion.

References Cited by the Examiner

UNITED STATES PATENTS

| 1,723,307 | 8/29 | Sipe. | |
| 1,820,220 | 8/31 | Geyer | 280—87 |
| 1,869,437 | 8/32 | Rangnow | 180—70 |
| 1,879,287 | 9/32 | Johnson | 74—490 X |
| 2,013,242 | 9/35 | Johns | 138—118 X |
| 2,751,793 | 6/56 | Sandberg | 74—566 X |
| 2,761,525 | 9/56 | Moss | 138—148 |
| 2,800,800 | 7/57 | Dunn | 74—490 X |
| 2,816,455 | 12/57 | Hammond | 74—492 |
| 2,959,067 | 11/60 | Primeau | 74—490 |

FOREIGN PATENTS

| 863,360 | 3/61 | Great Britain. |

BROUGHTON G. DURHAM, *Primary Examiner.*